US011785444B2

(12) United States Patent
Indurkar

(10) Patent No.: US 11,785,444 B2
(45) Date of Patent: *Oct. 10, 2023

(54) EMBEDDED SUBSCRIBER IDENTITY MODULE (ESIM) PROFILE ADAPTATION BASED ON CONTEXT

(71) Applicant: T-Mobile Innovations LLC, Overland Park, KS (US)

(72) Inventor: Dhananjay Indurkar, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/459,763

(22) Filed: Aug. 27, 2021

(65) Prior Publication Data

US 2021/0392490 A1    Dec. 16, 2021

Related U.S. Application Data

(63) Continuation of application No. 16/880,723, filed on May 21, 2020, now Pat. No. 11,140,543.

(51) Int. Cl.
*H04W 4/60* (2018.01)
*H04W 8/20* (2009.01)
(Continued)

(52) U.S. Cl.
CPC ............ *H04W 8/205* (2013.01); *H04L 67/12* (2013.01); *H04W 4/50* (2018.02); *H04W 4/60* (2018.02);
(Continued)

(58) Field of Classification Search
CPC ........... H04W 4/50; H04W 4/70; H04W 8/18; H04W 8/183; H04W 8/20; H04W 8/205;
(Continued)

(56) References Cited

U.S. PATENT DOCUMENTS 6,469,998 B1    10/2002    Burgaleta Salinas et al.
8,913,992 B2 *  12/2014    Schell ................. H04L 63/0853
                                                          455/12.1
(Continued)

FOREIGN PATENT DOCUMENTS

DE    102016201360 A1    8/2016
EP        2448301 A1    5/2012
(Continued)

OTHER PUBLICATIONS

Notice of Allowance dated Dec. 30, 2021, U.S. Appl. No. 17/023,347, filed Sep. 16, 2020.

(Continued)

*Primary Examiner* — Jean A Gelin

(57) ABSTRACT

An Internet of things (IoT) wireless communication module. The IoT wireless communication module comprises an antenna, a radio transceiver coupled to the antenna, an embedded universal integrated circuit card (eUICC) coupled to the radio transceiver, where the eUICC is provisioned with a plurality of eSIM profiles, a non-transitory memory, a processor coupled to the non-transitory memory, to the radio transceiver, and to the eUICC, and an eSIM profile adapter application stored in the non-transitory memory. When executed by the processor, the eSIM profile adapter application determines a system installation context of the IoT wireless communication module, selects one of the plurality of eSIM profiles stored in the eUICC based on the system installation context, and activates the selected eSIM profile in the eUICC.

19 Claims, 3 Drawing Sheets

(51) Int. Cl.
*H04W 4/50* (2018.01)
*H04L 67/12* (2022.01)
*G16Y 10/80* (2020.01)
*G16Y 40/35* (2020.01)
*H04W 12/45* (2021.01)
*H04W 84/04* (2009.01)

(52) U.S. Cl.
CPC .............. *G16Y 10/80* (2020.01); *G16Y 40/35* (2020.01); *H04W 12/45* (2021.01); *H04W 84/042* (2013.01)

(58) Field of Classification Search
CPC .............. H04W 12/06; H04W 12/0608; H04W 28/0268; H04W 28/24; H04L 47/14; H04L 47/805
See application file for complete search history.

(56) References Cited

U.S. PATENT DOCUMENTS

| | | | |
|---|---|---|---|
| 9,451,098 | B2 | 9/2016 | Zhu et al. |
| 9,942,755 | B2* | 4/2018 | Yang .................... H04W 12/06 |
| 10,194,320 | B1 | 1/2019 | Egner et al. |
| 10,200,364 | B1* | 2/2019 | Ketharaju ........... H04L 63/0853 |
| 10,455,536 | B1 | 10/2019 | Khawand et al. |
| 10,764,374 | B1* | 9/2020 | Marquardt ....... G06Q 20/40155 |
| 10,791,459 | B1* | 9/2020 | Hu ........................ H04W 8/245 |
| 10,833,929 | B2 | 11/2020 | Watsen et al. |
| 10,880,711 | B1* | 12/2020 | Holmes ................. H04W 8/245 |
| 10,887,741 | B1 | 1/2021 | Indurkar |
| 11,064,352 | B2* | 7/2021 | Yang .................... H04W 8/205 |
| 11,102,646 | B1 | 8/2021 | Indurkar |
| 11,115,810 | B1 | 9/2021 | Indurkar |
| 11,140,543 | B1 | 10/2021 | Indurkar |
| 11,190,985 | B1 | 11/2021 | Indurkar |
| 11,310,654 | B1 | 4/2022 | Indurkar |
| 11,477,624 | B1 | 10/2022 | Indurkar |
| 11,477,636 | B1 | 10/2022 | Indurkar |
| 11,570,793 | B2 | 1/2023 | Shaw |
| 11,601,817 | B2 | 3/2023 | Li et al. |
| 11,716,612 | B1 | 8/2023 | Indurkar |
| 11,722,880 | B2 | 8/2023 | Indurkar |
| 2005/0175019 | A1 | 8/2005 | Kalavade et al. |
| 2005/0192035 | A1 | 9/2005 | Jiang |
| 2011/0246374 | A1 | 10/2011 | Franz |
| 2012/0252445 | A1 | 10/2012 | Lindholm et al. |
| 2013/0029637 | A1 | 1/2013 | Hillier et al. |
| 2014/0004827 | A1 | 1/2014 | O'Leary |
| 2015/0303966 | A1 | 10/2015 | Lee et al. |
| 2015/0334111 | A1* | 11/2015 | Ziat .................... H04W 12/086 713/173 |
| 2015/0334552 | A1 | 11/2015 | Li et al. |
| 2016/0020802 | A1 | 1/2016 | Lee et al. |
| 2016/0020803 | A1 | 1/2016 | Cha et al. |
| 2016/0021484 | A1 | 1/2016 | Park et al. |
| 2016/0092145 | A1 | 3/2016 | Manning et al. |
| 2016/0119780 | A1 | 4/2016 | Jung et al. |
| 2016/0246611 | A1 | 8/2016 | Li et al. |
| 2016/0255567 | A1 | 9/2016 | Petersson et al. |
| 2016/0269891 | A1 | 9/2016 | Chen et al. |
| 2016/0308768 | A1 | 10/2016 | Yoon et al. |
| 2017/0118622 | A1 | 4/2017 | Jiang |
| 2017/0289788 | A1 | 10/2017 | Lalwaney |
| 2018/0014178 | A1 | 1/2018 | Baek et al. |
| 2018/0014184 | A1 | 1/2018 | Schell et al. |
| 2018/0063697 | A1 | 3/2018 | Li et al. |
| 2018/0109942 | A1 | 4/2018 | Lipovkov |
| 2018/0376325 | A1 | 12/2018 | Xu et al. |
| 2019/0058983 | A1 | 2/2019 | Guven et al. |
| 2019/0058989 | A1 | 2/2019 | Park et al. |
| 2019/0098488 | A1 | 3/2019 | Syed et al. |
| 2019/0132204 | A1 | 5/2019 | McGarth et al. |
| 2019/0140837 | A1 | 5/2019 | Cheng et al. |
| 2019/0141002 | A1* | 5/2019 | Balasubramanian ........................ H04L 41/5006 |
| 2019/0208405 | A1 | 7/2019 | Park et al. |
| 2020/0092711 | A1* | 3/2020 | Chen .................... H04W 8/205 |
| 2020/0120494 | A1 | 4/2020 | Fares et al. |
| 2020/0137566 | A1 | 4/2020 | Jin et al. |
| 2020/0154263 | A1 | 5/2020 | Guday et al. |
| 2020/0178070 | A1 | 6/2020 | Yang et al. |
| 2020/0221294 | A1 | 7/2020 | Kang et al. |
| 2020/0228488 | A1 | 7/2020 | Xu et al. |
| 2020/0236529 | A1* | 7/2020 | Anslot .................. H04W 8/205 |
| 2020/0260241 | A1 | 8/2020 | Sicard |
| 2020/0322846 | A1 | 10/2020 | Hampali et al. |
| 2020/0322884 | A1* | 10/2020 | Di Girolamo ........ H04W 48/18 |
| 2020/0351651 | A1 | 11/2020 | Koo et al. |
| 2020/0351761 | A1 | 11/2020 | Horna |
| 2020/0389783 | A1 | 12/2020 | Kang et al. |
| 2020/0404501 | A1 | 12/2020 | Kang et al. |
| 2021/0029761 | A1 | 1/2021 | Jung et al. |
| 2021/0044947 | A1* | 2/2021 | Bouskila ............... H04W 8/183 |
| 2021/0076195 | A1 | 3/2021 | Chaugule et al. |
| 2021/0076204 | A1* | 3/2021 | Goyal ................... H04L 67/306 |
| 2021/0112401 | A1 | 4/2021 | Chadwick et al. |
| 2021/0112413 | A1 | 4/2021 | Pazhyannur |
| 2021/0112423 | A1 | 4/2021 | Maheshwari et al. |
| 2021/0120387 | A1* | 4/2021 | Roy ........................ H04W 4/50 |
| 2021/0120424 | A1 | 4/2021 | Kang et al. |
| 2021/0133668 | A1* | 5/2021 | Mikayelyan .......... A47J 31/407 |
| 2021/0136588 | A1* | 5/2021 | Voicu .................. H04W 12/086 |
| 2021/0306830 | A1 | 9/2021 | Williams et al. |
| 2021/0352132 | A1* | 11/2021 | Nix ...................... H04L 9/3247 |
| 2021/0377722 | A1 | 12/2021 | Fan et al. |
| 2021/0377808 | A1 | 12/2021 | Indurkar |
| 2022/0191678 | A1 | 6/2022 | Indurkar |
| 2022/0322069 | A1* | 10/2022 | Chughtai .............. H04W 60/04 |
| 2022/0417727 | A1 | 12/2022 | Indurkar |

FOREIGN PATENT DOCUMENTS

| | | | |
|---|---|---|---|
| EP | 2448216 | A1 | 5/2015 |
| EP | 3276993 | A1 | 1/2018 |
| EP | 4136868 | | 2/2023 |
| EP | 4140157 | | 3/2023 |
| WO | 2018018332 | A1 | 10/2018 |
| WO | 20210242697 | A1 | 12/2021 |

OTHER PUBLICATIONS

Foreign Communication From a Related Counterpart Application, International Search Report and Written Opinion dated Sep. 28, 2021, International Application No. PCT/US2021/033041 filed on May 18, 2021.

Indurkar, Dhananjay, "Electronic Subscriber Identity Module (eSIM) Profile Provisionin" filed Aug. 31, 2022, U.S. Appl. No. 17/899,414.

Foreign Communication From a Related Counterpart Application, International Search Report and Written Opinion dated Sep. 28, 2021, International Application No. PCT/US2021/033922 filed on May 24, 2021.

Indurkar, Dhananjay, et al., "Electronic Subscriber Identity Module (eSIM) Profile Delivery and Activation System and Methods" filed Feb. 28, 2022, U.S. Appl. No. 17/683,328.

FAIPP Pre-Interview Communication dated Apr. 15, 2021, U.S. Appl. No. 16/880,723, filed May 21, 2020.

Notice of Allowance dated Jun. 14, 2021, U.S. Appl. No. 16/880,723, filed May 21, 2020.

FAIPP Pre-Interview Communication dated Mar. 26, 2021, U.S. Appl. No. 16/821,937, filed Mar. 17, 2020.

Notice of Allowance dated May 19, 2021, U.S. Appl. No. 16/821,937, filed Mar. 17, 2020.

FAIPP Pre-Interview Communication dated Jan. 29, 2021, U.S. Appl. No. 16/821,943, filed Feb. 19, 2021.

Notice of Allowance dated Apr. 29, 2021, U.S. Appl. No. 16/821,943, filed Feb. 19, 2021.

Notice of Allowance dated Sep. 4, 2020, U.S. Appl. No. 16/821,950, filed Feb. 17, 2020.

FAIPP Pre-Interview Communication dated Apr. 5, 2021, U.S. Appl. No. 16/886,521, filed May 28, 2020.

(56) References Cited

OTHER PUBLICATIONS

Notice of Allowance dated Aug. 10, 2021, U.S. Appl. No. 16/886,521, filed May 28, 2020.
Indurkar, Dhananjay, et al., "Embedded Subscriber Identity Module (eSIM) Profile Adaptation Based on Context," filed May 21, 2020, U.S. Appl. No. 16/880,723.
Indurkar, Dhananjay, et al., "Activation Communication Addresses of Internet of Things Devices", filed Nov. 24, 2020, U.S. Appl. No. 17/102,627.
Indurkar, Dhananjay, et al., "Internet of Things (IoT) Devices Wireless Communication Service Management Platform" filed May 28, 2020, U.S. Appl. No. 16/886,521.
Indurkar, Dhananjay, et al., "Electronic Subscriber Identity Module (eSIM) Profile Delivery and Activation System and Methods" filed Sep. 16, 2020, U.S. Appl. No. 17/023,347.
Indurkar, Dhananjay, et al., "Electronic Subscriber Identity Module (eSIM) Profile Provisioning" filed Sep. 16, 2020, U.S. Appl. No. 17/023,352.
Indurkar, Dhananjay, et al., "Embedded Subscriber Identity Module (eSIM) Profile Adaptation Based on Context," filed May 18, 2021, International Application No. PCT/US21/33041.
Indurkar, Dhananjay, et al., "Internet of Things (IoT) Devices Wireless Communication Service Management Platform" filed May 24, 2021, International Application No. PCT/US21/33922.
Indurkar, Dhananjay, "Bootstrap Electronic Subscriber Identity Module Configuration," filed Aug. 20, 2021, U.S. Appl. No. 17/408,366.
Notice of Allowance dated Jun. 16, 2022, U.S. Appl. No. 17/102,627, filed Nov. 24, 2020.
FAIPP Pre-Interview Communication dated Apr. 22, 2022, filed Sep. 16, 2020, U.S. Appl. No. 17/023,352.
Notice of Allowance dated Jun. 7, 2022, filed Sep. 16, 2020, U.S. Appl. No. 17/023,352.
Office Action dated Feb. 2, 2023, U.S. Appl. No. 17/683,328, filed Feb. 28, 2022.
Office Action dated Mar. 2, 2023, U.S. Appl. No. 17/899,414, filed Aug. 31, 2022.
Notice of Allowance dated Mar. 15, 2023, U.S. Appl. No. 17/408,366, filed Aug. 20, 2021.
Notice of Allowance dated Apr. 4, 2023, U.S. Appl. No. 17/683,328, filed Feb. 28, 2022.
Notice of Allowance dated Jul. 27, 2023, U.S. Appl. No. 17/899,414, filed Aug. 31, 2022.

* cited by examiner

EMBEDDED SUBSCRIBER IDENTITY MODULE (ESIM) PROFILE ADAPTATION BASED ON CONTEXT ==

=== CROSS-REFERENCE TO RELATED APPLICATIONS ===

This application is a continuation of and claims priority under 35 U.S.C. § 120 to U.S. patent application Ser. No. 16/880,723 filed on May 21, 2020, entitled "Embedded Subscriber Identity Module (eSIM) Profile Adaptation Based on Context" by Dhananjay Indurkar, which is incorporated herein by reference in its entirety for all purposes.

=== STATEMENT REGARDING FEDERALLY SPONSORED RESEARCH OR DEVELOPMENT ===

Not applicable.

=== REFERENCE TO A MICROFICHE APPENDIX ===

Not applicable.

=== BACKGROUND ===

Wireless communication devices may complete an authentication process with a cell site to obtain a wireless communication link from the cell site and access to the radio access network that the cell site is a part of. This may involve the wireless communication device radio transceiver obtaining network access keys or network access credentials from a subscriber identity module (SIM) and providing those network access keys or network access credentials to the cell site. The SIM may be a smart card that comprises memory and a processor. SIM cards may be removable in some circumstances, for example in traditional mobile phones. By removing a first SIM card and installing a second SIM card in a mobile phone, a user may change his or her service provider network. Removable SIM cards may not be provided in some wireless communication devices, where the role of the SIM card is instead performed by an embedded universal integrated circuit card (eUICC) that may be provisioned with network access keys and/or network access credentials, one or more access point names (APNs), a preferred roaming list (PRL), branding information, applications, and other data artifacts. The radio transceiver may then obtain the network access keys or network access credentials from the eUICC and provide those network access keys or network access credentials to the cell site to obtain a wireless communication link.

=== SUMMARY ===

In an embodiment, an Internet of things (IoT) wireless communication module is disclosed. The IoT wireless communication module comprises an antenna, a radio transceiver coupled to the antenna, an embedded universal integrated circuit card (eUICC) coupled to the radio transceiver, where the eUICC is provisioned with a plurality of eSIM profiles, a non-transitory memory, a processor coupled to the non-transitory memory, to the radio transceiver, and to the eUICC, and an eSIM profile adapter application stored in the non-transitory memory. When executed by the processor, the eSIM profile adapter application determines a system installation context of the IoT wireless communication module, selects one of the plurality of eSIM profiles stored in the eUICC based on the system installation context, and activates the selected eSIM profile in the eUICC.

In another embodiment, a method of adapting an Internet of things (IoT) wireless communication module for use in different operating environments is disclosed. The method comprises determining a system operating environment of an IoT wireless communication module by an eSIM profile adapter application executing on the IoT wireless communication module, selecting one of a plurality of eSIM profiles stored in an embedded universal integrated circuit card (eUICC) of the IoT wireless communication module based on the system operating environment, and activating the selected eSIM profile on the eUICC by the eSIM profile adapter application. The method further comprises reading the activated eSIM profile from the eUICC by a radio transceiver of the IoT wireless communication module and communicating wirelessly by the radio transceiver based on the activated eSIM profile.

In yet another embodiment, an Internet of things (IoT) wireless communication module is disclosed. The IoT wireless communication module comprises, comprising an antenna, a radio transceiver coupled to the antenna, an embedded universal integrated circuit card (eUICC) coupled to the radio transceiver, where the eUICC is provisioned with a plurality of eSIM profiles, a non-transitory memory, a processor coupled to the non-transitory memory, to the radio transceiver, and to the eUICC, and an eSIM profile adapter application stored in the non-transitory memory. When executed by the processor, the eSIM profile adapter application monitors wireless communication of the radio transceiver, sends a summary of the monitored wireless communication to a server via the radio transceiver, receives a selection of one of the plurality of eSIM profiles from the server, and activates the selected eSIM profile in the eUICC.

These and other features will be more clearly understood from the following detailed description taken in conjunction with the accompanying drawings and claims.

=== BRIEF DESCRIPTION OF THE DRAWINGS ===

For a more complete understanding of the present disclosure, reference is now made to the following brief description, taken in connection with the accompanying drawings and detailed description, wherein like reference numerals represent like parts.

=== DETAILED DESCRIPTION ===

Figure 1:
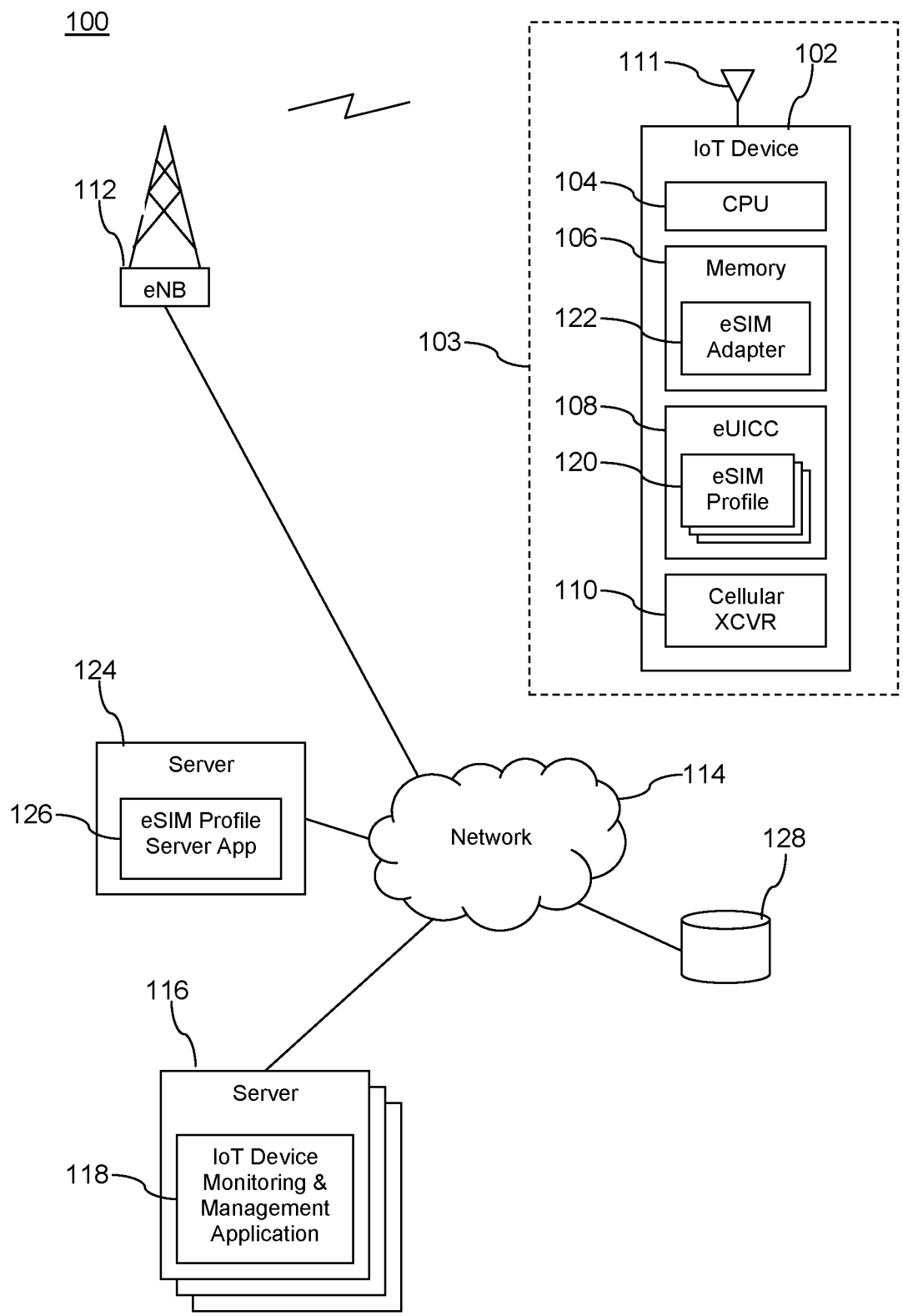
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, an IoT device may be a generic IoT wireless communication module that may be installed into a variety of different appliances or systems. The IoT device can broker communications between the system in which it is installed and a wireless network, for example a radio access network (RAN) operated by a mobile network operator or wireless communication service provider. A communication configuration of the IoT device may desirably be different when installed into different appliances or different systems. For example, an IoT device installed into a visual monitoring system may desirably have an asymmetrical data throughput communication configuration (e.g., supporting high uplink data flow rate and low downlink data flow rate). The very same IoT device, however, installed in a different system such as a refrigerator may desirably be provided with a different communication configuration that supports a low data flow rate.

The communication configuration of the IoT device may be provided by an eSIM profile. The eSIM profile may comprise wireless communication service provider data and wireless communication service subscriber data that defines a level of communication service that is to be provided to the IoT device. The eSIM profile may comprise RAN access credentials, network keys, a communication address or a phone number, one or more access point names (APNs), a preferred roaming list (PRL), branding information, applications, and other data artifacts. The IoT device may be pre-loaded with a plurality of eSIM profiles, each eSIM profile associated with a different quality of service, and the IoT device may autonomously determine which eSIM profile is to be activated based on an identity of the system it is installed in. For example, an eSIM profile adapter application executing on the IoT device may evaluate the installation context or operation environment of the IoT device and select and install one of the pre-loaded eSIM profiles based on that evaluation. Alternatively, the IoT device may establish initial communication to a RAN based on a bootstrap eSIM profile or initial eSIM profile and send a message that identifies the system and/or appliance that it is installed in. A server executing an eSIM profile server application may look-up a suitable eSIM profile based on identity of the system or appliance and command the IoT device to activate the looked-up eSIM profile. The eSIM profile server application may send the looked-up eSIM profile to the IoT device, in case it is not pre-loaded with the looked-up eSIM profile.

Some of the different communication service levels may be (1) doing text messaging only with no data, (2) doing data only communication, no texting, (3) voice over IP (VoIP) service, (4) low latency, high throughput data communication, (5) IMS communication service, (6) asymmetrical throughput (e.g., high throughput downlink with low throughput uplink or low throughput downlink with high throughput uplink), and others. Two or more different communication services may be combined in a single eSIM profile. In an embodiment, the IoT device may operate with a default initial eSIM profile, collect performance data and/or operational data related to the communication activities of the IoT device installed in an appliance or system, share the performance data and/or operational data back to a server, and the server may evaluate what eSIM profile would be most suitable to that IoT device based on its usage history and its performance data. The server may then command the IoT device to activate the subject eSIM profile. The server may transmit the subject eSIM profile to the IoT device, in the case it is not pre-loaded with the subject eSIM profile.

The system taught herein promotes eSIM profile automatic adaptation based on context or based on operational environment. An earlier approach included having a different IoT device—a different stock keeping unit (SKU) identity—for each different installation context, which increased testing requirements (each different SKU device had to be tested independently to assure it did not violate radio spectrum regulations) and increased other costs. Another earlier approach involved configuring the IoT device for wireless communication over-the-air, a process that consumed significant radio bandwidth and processing power in the IoT device.

The approach to configuring the communication services of the IoT device of the present disclosure can promote ease of delivering IoT devices to the marketplace, in that the IoT device (e.g., the IoT wireless communication module) need not be narrowly targeted to a specific appliance or system and instead can be adapted to the appliance or system after installation. This can be useful both in promoting use of IoT devices by consumers and by enterprises. An enterprise can buy large volumes of such an IoT device, install the IoT devices in different systems and/or appliances, and the IoT device can autonomously configure itself with a desirable eSIM profile. This approach may relieve designers or manufacturers or distributors of complicated component selection activities and/or configuration steps. This can avoid consumption of limited radio resources. This may allow distributors of the IoT devices to maintain a smaller inventory volume of IoT devices, thereby constraining their cost of doing business. Because the final configuration of the eSIM profile into the IoT device according to the present disclosure takes place at the time the IoT device is deployed not when it is purchased, the IoT device can gain the benefits of eSIM profile improvements which might not have been available when the IoT device was manufactured or when the IoT device was purchased. The adaptation and/or configuration of a suitable eSIM profile into the IoT device can be totally automated.

Turning now to FIG. 1, a system 100 is described. In an embodiment, the system 100 comprises an IoT wireless communication module (e.g., an IoT device) 102 installed in a system or appliance 103. The IoT device 102 comprises a processor 104, a memory 106, an embedded universal integrated circuit card (eUICC) 108, a cellular radio transceiver 110, and an antenna 111. A portion of the memory 106 may be a non-transitory memory and a portion of the memory 106 may be a transitory memory. When properly activated and provisioned with an eSIM profile, the IoT device 102 may be able to establish a wireless communication link to a radio access network (RAN), for example to a cell site 112. The cell site 112 may provide the IoT device 102 a communication link to a network 114. The network 114 is one or more public networks, one or more private networks, or a combination thereof. The IoT device 102 may communicate via the cell site 112 and via the network 114 to a server 116 communicatively coupled to the network 114 and to an IoT device monitoring and management application 118 that executes on the server 116. Communication between the IoT device 102 and the IoT device monitoring and management application 118 may allow the IoT device 102 to perform a communication service for the appliance 103. For example, the IoT device 102 may collect data about the activities of the appliance 103 and report these activities back to the IoT device monitoring and management application 118. For example, the IoT device 102 may receive commands from the IoT device monitoring and management application 118 and may covey those commands to the appliance 103.

The appliance 103 may be a refrigerator, a heating ventilation and air conditioning (HVAC) system, a remote sensor, a remote control device, or other kind of appliance or system. The cellular radio transceiver may be able to establish wireless communication with the cell site 112 via the antenna 111 based on a 5G, a long term evolution (LTE), a code division multiple access (CDMA), or a global system for mobile communications (GSM) telecommunications protocol. While a single IoT device 102 in a single appliance 103 is illustrated in FIG. 1, it is understood that the system 100 may comprise any number of appliances 103 and IoT devices 102. While one IoT device 102 is illustrated as present in appliance 103, in an embodiment, the appliance 103 may have two or more IoT devices 102 installed in it.

The communication service provided to the IoT device 102 by the cell site 112 and/or by the network 114 may in part be determined based on access credentials or access point names (APNs) provided by the IoT device 102 to the cell site 112 when requesting a wireless communication link from the cell site 112. The access credentials and APNs may be read by the cellular radio transceiver 110 from the eUICC 108, for example an active eSIM profile 120 stored in the eUICC 108. In an embodiment, the eUICC 108 may be pre-loaded with a plurality of eSIM profiles 120, where only one eSIM profile 120 is active at any one time. In an embodiment, the cellular radio transceiver 110 may receive the access credentials and APNs from the eUICC 108, by reading from the eUICC 108 or by invoking an application programming interface (API) of the eUICC 108 to read from the eUICC 108.

The appliance 103 may be referred to as a system installation context, and the installation context may be defined by the identity of the appliance 103. Alternatively, in an embodiment, the system installation context may be defined, at least in part, by a communication history of the IoT device 102. For example, an eSIM profile adapter 122 may track communication activities of the IoT device 102, use this history of communication activities to categorize or classify the communications usage of the IoT device 102, and define the system installation context in terms of a typical communications usage category of the IoT device 102. The eSIM profile adapter 122 may be an application stored in a non-transitory portion of the memory 106 and be executed by the processor 104.

In an embodiment, when the IoT device 102 is first powered on in the appliance 103, the eSIM profile adapter 122 determines an identity of the appliance 103, selects a suitable one of the eSIM profiles 120 pre-loaded into the eUICC, and activates the selected eSIM profile 120 for use in cellular radio communications. For example, the eSIM profile adapter 122 may use the identity of the appliance 103 as an index into a data structure stored in the non-transitory portion of the memory 106, for example look-up table, to look-up an eSIM profile 120 that matches the index. The identity of the appliance 103 may be a name of the appliance or a make and model of the appliance.

In an embodiment, the eSIM profile adapter 122 may send an eSIM profile selection request message including the identity of the appliance 103 to a server 124 executing an eSIM profile server application 126. The server 116 and the server 124 may be implemented as computer systems. Computer systems are described further hereinafter. The eSIM profile server application 126 may use the identity of the appliance 103 to look up a suitable eSIM profile identity in a data store 128 and return this identity to the eSIM profile adapter 122. The eSIM profile adapter 122 may then activate the eSIM profile 120 identified by the eSIM profile server application 126. Alternatively, the eSIM profile server application 126 may acquire the eSIM profile 120 from the data store 128 and send the looked-up eSIM profile 120 to the eSIM profile adapter 122. The eSIM profile adapter 122 may then store the received eSIM profile 120 in the eUICC 108 and then make that stored eSIM profile 120 the active eSIM profile of the eUICC 108.

In an embodiment, the eUICC 108 may initially have a bootstrap eSIM profile active. The IoT device 102 may obtain a wireless communication link from the cell site 112 based on the bootstrap eSIM profile. The eSIM profile adapter 122 may then communicate with the eSIM profile server application 126 to obtain an identity of a pre-loaded eSIM profile 120 to activate or may obtain an eSIM profile 120 from the eSIM profile server application 126, store the received eSIM profile 120 in the eUICC 108, and make the downloaded eSIM profile 120 active on the eUICC 108.

In an embodiment, the eUICC 108 may have a default or generic eSIM profile 120 that is initially activated. The eSIM profile adapter 122 may collect or otherwise obtain data on the communication activity of the IoT device 102 and send this communication and/or performance data to the eSIM profile server application 126. This data may be referred to as a communication history of the IoT device 102. The collected communication history data may comprise information about average sent data volumes. The collected communication history data may comprise information about average received data volume. The collected communication history data may comprise information about communication services used by the IoT device 102. The eSIM profile server application 126 may analyze the communication and performance history of the IoT device 102 and identify a suitable eSIM profile 120 that it then commands the eSIM profile adapter 122 to activate in the eUICC 108. Alternatively, the eSIM profile server application 126 sends the eSIM profile 120 to the eUICC 108 and commands the eSIM profile adapter 122 to activate that downloaded eSIM profile 120.

Figure 2:
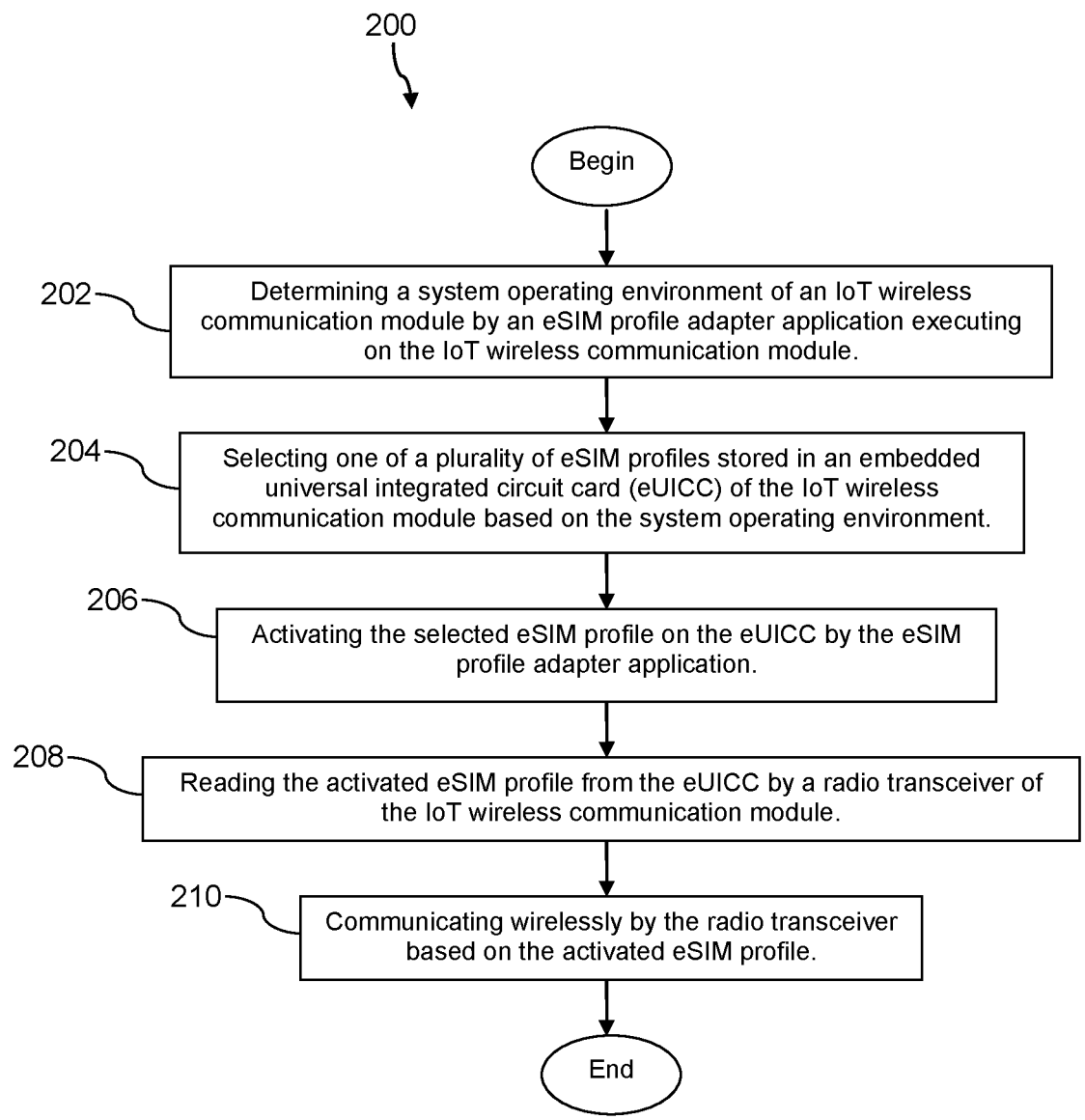
FIG. 2 is a flow chart of a method according to an embodiment of the disclosure.

Turning now to FIG. 2, a method 200 is described. In an embodiment, the method 200 is a method of adapting an Internet of things (IoT) wireless communication module for use in different operating environments. At block 202, the method 200 comprises determining a system operating environment of an IoT wireless communication module by an eSIM profile adaptation application executing on the IoT wireless communication module. The processing of block 202 may comprise identifying an identity of a system or appliance in which the IoT wireless communication module is installed. For example, the IoT wireless communication module may read a unique electronic identity of the system or appliance. For example, the IoT wireless communication module may receive an identity of the system or appliance from a radio frequency identity (RFID) of coupled to the system or appliance. In an embodiment, the processing of block 202 may comprise collecting communication history and performance data and providing this information to a server that analyzes the data to determine the system operating environment.

At block 204, the method 200 comprises selecting one of a plurality of eSIM profiles stored in an embedded universal integrated circuit card (eUICC) of the IoT wireless communication module based on the system operating environment. The processing of block 204 may comprise looking up an eSIM profile identity based on the system operating environment by the eSIM profile adapter application. The processing of block 204 may comprise a server selecting an identity of a suitable eSIM profile based on the system operating environment. The server may then send the identity of the eSIM profile to the eSIM profile adapter application. In an embodiment, the server may send the eSIM profile itself to the eSIM profile adapter application, and the eSIM profile adapter application may store that eSIM profile in the eUICC. In an embodiment, the processing of block 204 is performed autonomously by the eSIM profile adapter application. At block 206, the method 200 comprises activating the selected eSIM profile on the eUICC by the eSIM profile adapter application.

At block 208, the method 200 comprises reading the activated eSIM profile from the eUICC by a radio transceiver of the IoT wireless communication module. Alternatively, the eSIM profile adapter application may read the activated eSIM profile from the eUICC and provide at least some of the content of the eSIM profile to the radio transceiver. At block 210, the method 200 comprises communicating wirelessly by the radio transceiver based on the activated eSIM profile. The radio transceiver may communicate wireless with a cell site based on presenting access credentials and/or one or more access point name (APN) to the cell site.

In an embodiment, the method 200 further comprises sending data about the system operating environment by the eSIM profile adapter application to an eSIM profile server application executing on a server computer; and receiving an identity of the selected eSIM profile from the eSIM profile server application.

Figure 3:
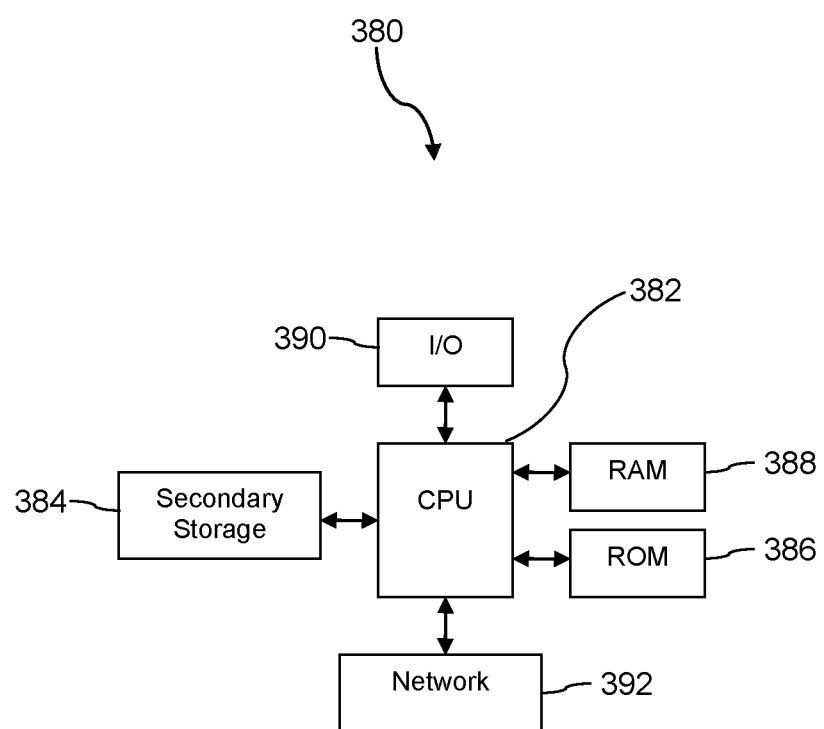
FIG. 3 is a block diagram of a computer system according to an embodiment of the disclosure.

FIG. 3 illustrates a computer system 380 suitable for implementing one or more embodiments disclosed herein. For example, in an embodiment, the server 116 and the server 124 described above may be implemented in a form similar to that of computer system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An Internet of things (IoT) wireless communication module, comprising:
   an antenna;
   a radio transceiver coupled to the antenna;
   an embedded universal integrated circuit card (eUICC) coupled to the radio transceiver, where the eUICC is provisioned with a plurality of eSIM profiles;
   a non-transitory memory;
   a processor coupled to the non-transitory memory, to the radio transceiver, and to the eUICC; and
   an eSIM profile adapter application stored in the non-transitory memory that, when executed by the processor:
      determines a system operating environment of the IoT wireless communication module, wherein determining the system operating environment of the IoT wireless communication module comprises determining an identity of a system or an appliance in which the IoT wireless communication module is installed,
      selects one of the plurality of eSIM profiles stored in the eUICC based on the system operating environment including the identity of the system or the appliance in which the IoT wireless communication module is installed, and
      activates the selected eSIM profile in the eUICC to enable communication with a radio access network operated by a wireless communication service provider according to at least one communication service defined by the selected eSIM profile.

2. The IoT wireless communication module of claim 1, wherein selecting one of the plurality of eSIM profiles stored in the eUICC based on the identity of the system or the appliance comprises looking up an identity of an eSIM profile in a data structure stored in the non-transitory memory using the identity of the system or the appliance.

3. The IoT wireless communication module of claim 1, wherein the eUICC stores an initially activated default eSIM profile.

4. The IoT wireless communication module of claim 1, wherein the radio transceiver is configured to wirelessly communicate via at least one of a 5G, a long term evolution (LTE), a code division multiple access (CDMA), or a global system for mobile communications (GSM) telecommunications protocol.

5. The IoT wireless communication module of claim 1, wherein each of the plurality of eSIM profiles comprise one or more of network access credentials, access point names (APNs), a communication address, a preferred roaming list (PRL), applications, or branding information.

6. The IoT wireless communication module of claim 1, wherein the system comprises a heating air conditioning and ventilation (HVAC) system.

7. The IoT wireless communication module of claim 1, wherein the IoT wireless communication module is a generic IoT wireless communication module that is capable of being installed into a plurality of different appliances or systems, and wherein communication configuration of the IoT wireless communication module is different when installed into different appliances or different systems.

8. The IoT wireless communication module of claim 1, wherein the selection of the one of the plurality of eSIM profiles is based further on a communication history of the IoT wireless communication device.

9. A method of adapting an Internet of things (IoT) wireless communication module for use in different operating environments, comprising:
   determining a system operating environment of an IoT wireless communication module by an eSIM profile adapter application executing on the IoT wireless communication module, wherein determining the system operating environment of the IoT wireless communication module comprises determining an identity of a system or an appliance in which the IoT wireless communication module is installed;
   selecting one of a plurality of eSIM profiles stored in an embedded universal integrated circuit card (eUICC) of the IoT wireless communication module by the eSIM profile adapter application based on the system operating environment including at least the identity of the system or the appliance in which the IoT wireless communication module is installed;
   activating the selected eSIM profile on the eUICC by the eSIM profile adapter application;
   reading the activated eSIM profile from the eUICC by a radio transceiver of the IoT wireless communication module; and
   communicating wirelessly by the radio transceiver with a radio access network operated by a wireless communication service provider according to at least one communication service defined by the activated eSIM profile.

10. The method of claim 9, wherein communicating wirelessly by the radio transceiver comprises transmitting data about activities of the appliance in which the IoT wireless communication module is installed.

11. The method of claim 10, wherein the IoT wireless communication module is installed in the system, and wherein the system comprises a heating air conditioning and ventilation (HVAC) system.

12. The method of claim 9, wherein the eSIM profiles comprise network access credentials, access point names (APNs), a communication address, a preferred roaming list (PRL), applications, or branding information.

13. The method of claim 9, wherein the radio transceiver communicates wirelessly according to at least one of a 5G, a long term evolution (LTE), a code division multiple access (CDMA), or a global system for mobile communications (GSM) telecommunications protocol.

14. An Internet of things (IoT) wireless communication module, comprising:
   an antenna;
   a radio transceiver coupled to the antenna;
   an embedded universal integrated circuit card (eUICC) coupled to the radio transceiver, where the eUICC is provisioned with a plurality of eSIM profiles;
   a non-transitory memory;
   a processor coupled to the non-transitory memory, to the radio transceiver, and to the eUICC; and an eSIM profile adapter application stored in the non-transitory memory that, when executed by the processor:
- monitors wireless communication of the IoT wireless communication module transmitted via the radio transceiver,
- sends a summary of the monitored wireless communication of the IoT wireless communication module to a server via the radio transceiver,
- receives a selection of one of the plurality of eSIM profiles from the server based on the summary of the monitored wireless communication of the IoT wireless communication module, and
- activates the selected eSIM profile in the eUICC to enable communication with a radio access network operated a wireless communication service provider according to at least one communication service defined by the selected eSIM profile.

15. The IoT wireless communication module of claim 14, wherein the summary of monitored wireless communication comprises information about average sent data volume.

16. The IoT wireless communication module of claim 14, wherein the summary of monitored wireless communication comprises information about average received data volume.

17. The IoT wireless communication module of claim 14, wherein the summary of monitored wireless communication comprises information about communication services used by the IoT wireless communication module.

18. The IoT wireless communication module of claim 14, wherein the eSIM profiles comprise one or more of network access credentials, access point names (APNs), a communication address of the IoT wireless communication module, a preferred roaming list (PRL), an application, or branding information.

19. The IoT wireless communication module of claim 14, wherein the radio transceiver is configured to wirelessly communicate via at least one of a 5G, a long-term evolution (LTE), a code division multiple access (CDMA), or a global system for mobile communications (GSM) telecommunications protocol.

* * * * *